United States Patent
Aaron et al.

(10) Patent No.: US 10,169,427 B2
(45) Date of Patent: Jan. 1, 2019

(54) PERSONALIZED HIGHLIGHTER FOR TEXTUAL MEDIA

(71) Applicant: International Business Machines Corporation, Armonk, NY (US)

(72) Inventors: Andrew S. Aaron, Ardsley, NY (US); Shang Q. Guo, Cortlandt Manor, NY (US); Jonathan Lenchner, North Salem, NY (US); Daniel A. Mazzella, Henderson, NV (US); Maharaj Mukherjee, Poughkeepsie, NY (US); John C. Nelson, Newtown, CT (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/951,899

(22) Filed: Nov. 25, 2015

(65) Prior Publication Data
US 2017/0147655 A1    May 25, 2017

(51) Int. Cl.
G06F 17/30    (2006.01)
G06F 17/21    (2006.01)

(52) U.S. Cl.
CPC ...... *G06F 17/30539* (2013.01); *G06F 17/211* (2013.01); *G06F 17/30011* (2013.01); *G06F 17/30522* (2013.01); *G06F 17/30554* (2013.01)

(58) Field of Classification Search
CPC ......... G06F 17/30539; G06F 17/30011; G06F 17/30522; G06F 17/30554
USPC ....................................................... 707/722
See application file for complete search history.

(56) References Cited

U.S. PATENT DOCUMENTS

| | | | |
|---|---|---|---|
| 6,900,819 B2 | 5/2005 | Marshall et al. | |
| 7,000,183 B1 | 2/2006 | Crawford, Jr. | |
| 7,225,187 B2 * | 5/2007 | Dumais | G06F 17/30613 |
| 7,702,611 B2 | 4/2010 | Chi et al. | |
| 8,359,193 B2 | 1/2013 | Chen et al. | |
| 8,898,595 B2 | 11/2014 | Cragun et al. | |
| 2007/0124672 A1 * | 5/2007 | Cragun | G06F 17/30716 715/234 |
| 2011/0191663 A1 | 8/2011 | Magas et al. | |
| 2013/0305149 A1 | 11/2013 | Dimitrov et al. | |

OTHER PUBLICATIONS

J. Ševcech et al, "User's Interest Detection Through Eye Tracking for Related Documents Retrieval," Proceedings of the 9th International Workshop on Semantic and Social Media Adaptation and Personalization (SMAP), Nov. 2014, pp. 9-13.

R. Badi et al., "Recognizing User Interest and Document Value from Reading and Organizing Activities in Document Triage," Proceedings of the 11th International Conference on Intelligent User Interfaces (IUI), Jan. 2006, pp. 218-225.

* cited by examiner

*Primary Examiner* — Monica M Pyo
(74) *Attorney, Agent, or Firm* — Rahan Uddin; Ryan, Mason & Lewis, LLP

(57) ABSTRACT

A method for highlighting an electronic document comprises mining one or more sources to obtain data corresponding to a user, inferring one or more interests of the user based on the data, analyzing the electronic document to determine at least one portion of the electronic document related to the one or more interests, and automatically highlighting the at least one portion of the electronic document related to the one or more interests.

19 Claims, 5 Drawing Sheets

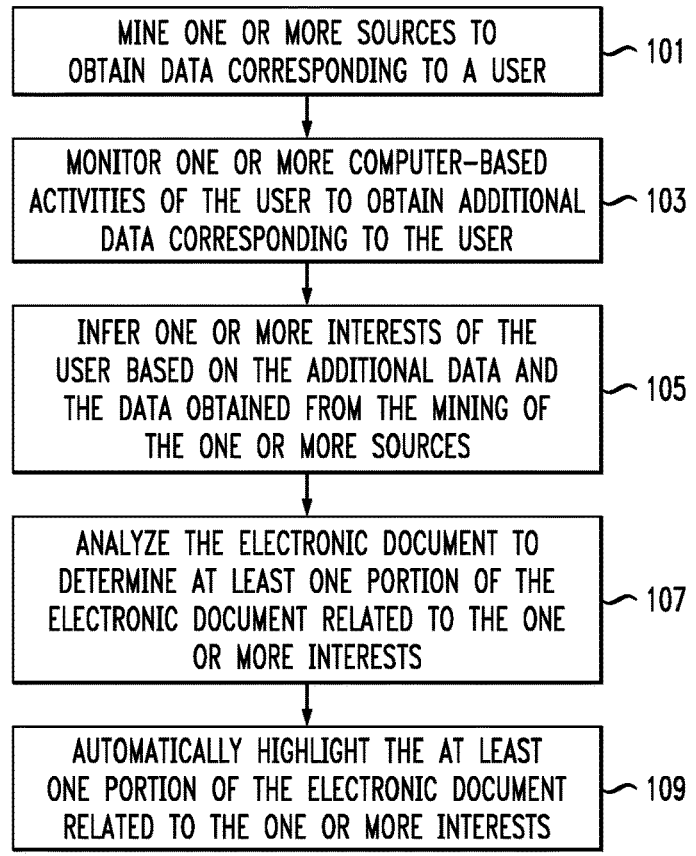
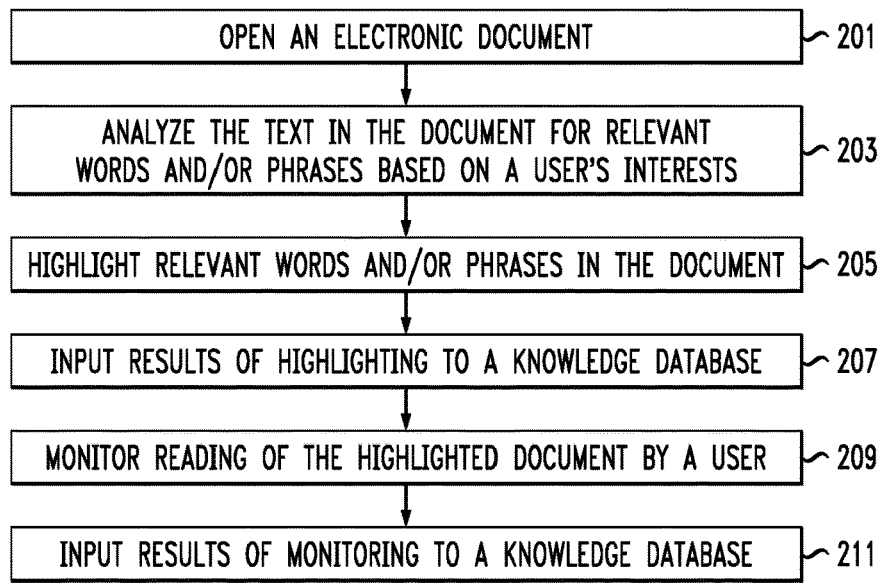

300

410

PERSONALIZED HIGHLIGHTER FOR TEXTUAL MEDIA

TECHNICAL FIELD

The field generally relates to presenting textual media to user and, in particular, to automatically highlighting portions of the textual media based on inferred interests of a user.

BACKGROUND

When reading an article, for example, a technical article, often because of limited time, a person may scan the article, reading only select portions. When reading in this manner, there is an increased probability of missing important sections, points and/or insights.

A known attempt to address this issue includes automatic presentation of a summary of an electronic document by presenting the summarization as a body of text, which does not necessarily provide readers with those sections that the reader needs or may be of most interest.

SUMMARY

According to an exemplary embodiment of the present invention, a method for highlighting an electronic document comprises mining one or more sources to obtain data corresponding to a user, inferring one or more interests of the user based on the data, analyzing the electronic document to determine at least one portion of the electronic document related to the one or more interests, and automatically highlighting the at least one portion of the electronic document related to the one or more interests.

According to an exemplary embodiment of the present invention, a system for highlighting an electronic document comprises a memory and at least one processor coupled to the memory, wherein the at least one processor is configured to mine one or more sources to obtain data corresponding to a user, infer one or more interests of the user based on the data, analyze the electronic document to determine at least one portion of the electronic document related to the one or more interests, and automatically highlight the at least one portion of the electronic document related to the one or more interests.

According to an exemplary embodiment of the present invention, a computer program product for highlighting an electronic document comprises a computer readable storage medium having program instructions embodied therewith, the program instructions executable by a processor to cause the processor to perform a method comprising mining one or more sources to obtain data corresponding to a user, inferring one or more interests of the user based on the data, analyzing the electronic document to determine at least one portion of the electronic document related to the one or more interests, and automatically highlighting the at least one portion of the electronic document related to the one or more interests.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 1 is a flow diagram of a process for highlighting an electronic document, according to an exemplary embodiment of the invention.

FIG. 2 is a flow diagram of a process for highlighting an electronic document, according to an exemplary embodiment of the invention.

DETAILED DESCRIPTION

Figure 3:
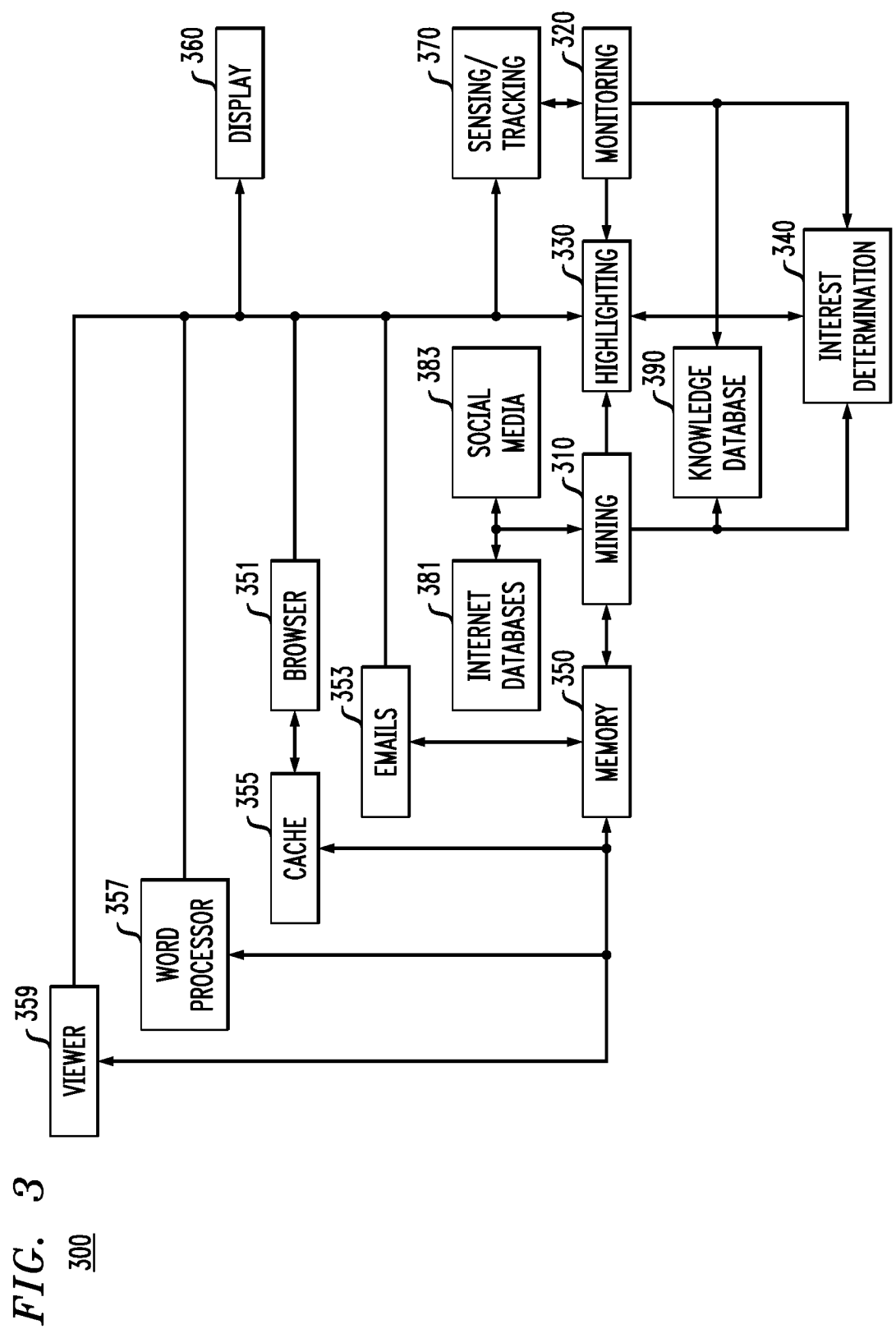
FIG. 3 is a block diagram of a system for highlighting an electronic document, according to an exemplary embodiment of the present invention.

Exemplary embodiments of the invention will now be discussed in further detail with regard to presenting textual media to a user and, in particular, to automatically highlighting portions of the textual media based on inferred interests of a user. This invention may, however, be embodied in many different forms and should not be construed as limited to the embodiments set forth herein.

In accordance with an exemplary embodiment of the present invention, a system is provided that automatically guides a reader to those sections of an article that are likely to be of the most interest to the reader. More specifically, according to an embodiment, a learned assessment of user interests and/or preferences is applied to automatically highlight portions of an electronic document that are likely to be of the most interest to a user reading the document.

As used herein, "highlighting" can refer to changing an appearance of a portion of the text of an electronic document, and includes, but is not necessarily limited to, bolding, underlining, italicizing, altering a style, color and/or size of font, and/or surrounding the text by a color, for example, a bright color, such as yellow or pink, similar to manual highlighting performed using a colored magic marker.

As used herein, an "electronic documents" can refer to emails, documents that a user has created (e.g. documents created on a word processor), documents that a user has viewed (e.g., articles, papers viewed in a viewer, such as a PDF viewer), textual media that a user has viewed or accessed on a browser, and/or any other type of textual media accessed and presented to a user via electronic means.

As opposed to known methods of presenting a textual summary of an electronic document, the embodiments of the present invention are able to take advantage of a scenario where a reader finds a highlighted item especially interesting, and the reader is then motivated to read further in the text neighboring the highlighted item. The embodiments of the present invention provide a reader with the ability to see important items in context, so that the reader can readily further peruse subjects of interest around the highlighted items. Such a result is not possible when reading just a summary.

Embodiments of the present invention propose to automatically learn what interests readers by data mining certain items of the reader, for example, their emails, created documents, social media posts and prior read articles (e.g., from the Internet or in a memory of the user's computer). Embodiments of the present invention propose to automatically learn what interests readers by monitoring their reading and searching activities, for example, what key words readers search for, and which sections of an article readers spend the most time on. In accordance with an embodiment of the present invention, sensing/tracking software associated with, for example, a browser or viewer, can keep track of search terms used and the time a user spends on each page, and can therefore determine which sections a user has spent the most time on.

Based on the mining and monitoring, embodiments of the present invention can determine what topics most interest readers, and/or what a reader may be working on, and use one or more of the determinations to automatically highlight sections of an article likely to be of most interest to readers. Based on historical reading times for similar documents, the system can also estimate an amount of time for reading highlighted sections and for reading part of or an entirety of an electronic document. Embodiments of the present invention require little or no effort from a user to implement since the user interests and/or preferences can be automatically determined without a need for users to affirmatively state or define their interests and/or preferences.

In accordance with an embodiment of the present invention, the system tracks what a user searches for leading up to his/her finding and reading of an article, thereby gathering contextual clues for what the user is looking for and, therefore, what should be highlighted. For example, a physician may be searching for information on a particular disease and, in particular, its symptoms. Once the physician finds and decides to read a particular article about the disease, the system, based on the physician's searches performed right before or within a given browser session for finding the particular article, automatically highlights those portions of the article addressing the symptoms of the disease. The searches a user performs prior to finding the content that the user wants to read may have key words and/or terms on which the system can rely to select portions of the content that should be highlighted.

According to an embodiment, a reader may be interested in highlighting different aspects of an article. These different aspects can be highlighted differently from each other, for example, by using different colors or by some other means of distinguishing between highlighted portions (e.g., italicized text versus underlined text). Possible categories warranting different highlighting can include, but are not limited to: (1) material related to what the system concludes that a reader is most familiar with; (2) material that the system concludes a reader is likely unfamiliar with; (3) material that the system concludes appears to be a new contribution in a particular field; (4) material that system recognizes has been specifically asserted to be a new contribution in a particular field; and (5) definitions of words in a document (e.g., that the system suspects may not be known to a reader). The system may display the definition each time the defined word or concept is used in the document, or when a user moves a mouse pointer over the defined word or concept. The system may conclude what a reader is most familiar with if the same words have already been used in documents created by the reader, and/or in documents that the reader has previously read. Words in a document to be highlighted that do not appear in documents created by the reader, and/or in documents that the reader has previously read may be deemed unfamiliar by the system. In order to determine what material in a document is a new contribution in a particular field, the system may mine other documents (e.g., articles) in a given subject of the document to determine what words or phrases have been customarily used. If there are words or phrases in the present document that are not customary, the system may point to those non-customary words or phrases as being potentially new contributions.

In accordance with embodiments of the present invention, the system can highlight portions of a document at different levels, such as, for example, at the section, paragraph, sentence, phrase and/or word level. The system can also search for and recommend reference articles to help a reader better understand a current document.

The system may also track, via, for example, eyeball movement detection, where in a document a user is reading and automatically scroll to a next or previous highlighted section. Alternatively, the system can provide the ability for the user to jump from one highlighted portion to another highlighted portion based on some input by the user, such as, for example, a mouse click, a keyboard stroke and/or touchscreen swipe or pressure.

In connection with monitoring reading behavior, in accordance with an embodiment of the present invention, the system observes how a reader typically reads articles from a given source (e.g., PubMed®, a common reference source among physicians), including which article sections a reader spends the most time on, and what sections, and in what order the reader generally reads (e.g., an abstract, and then jumping to a results section). Based on this behavior, the system can highlight points in portions of the document likely to be read, so that a reader can quickly tell if he/she wants to read more of a particular article.

The embodiments of the present invention are not only applicable to ascertaining the interests and behaviors of readers as individuals, but are also applicable to ascertaining interests and behaviors of individuals as members of groups and teams, and/or of the groups and teams themselves. For example, the system can apply data mining and monitoring to collect and learn information from team members' documents related to a project in which a reader is involved (e.g., documents contained in a wiki), and then use this knowledge to identify and highlight the parts in a document relevant for the reader based on the interests of the group or team, and/or highlight parts of the document relevant for the group as a whole. Each reader in a group can have a particular highlighting style associated with them, such as, for example, color-coded distinct highlight colors for respective members of the group or team, and for the team itself. In this way, members of the group or team can focus, for example, on particular portions of a document that relate to their particular function in the group or on the team.

FIG. 1 is a flow diagram of a process for highlighting an electronic document, according to an exemplary embodiment of the invention. Referring to FIG. 1, the process 100 includes, at block 101, mining one or more sources to obtain data corresponding to a user. The one or more sources can include, but are not necessarily limited to, emails (e.g., emails sent and/or received by the user), created documents (e.g., documents that the user has written), documents that the user has viewed (e.g., articles, papers), a browsing history of the user and/or any other type of textual media associated with the user. The data can include, for example, words or phrases in the sources, for example, key words or key phrases, which can contribute to a determination of what the user is interested in, and/or what the user is working on. For example, if the user is an engineer, there may be technical words or phrases that are observed by the system across multiple sources, leading to a conclusion that the user is interested in the subject matter to which the technical words or subject matter relate. According to an embodiment of the present invention, the determination of what are key words or key phrases may be based on the frequency of use of the words or phrases in a source, with a higher frequency of use leading to a determination that a word or phrase is a key word or key phrase. However, in this case, the system would also have the ability to compare the frequency of occurrence of words used in the sources with the frequency of occurrence of those same words in the English language. As a result, the system can be prevented from wrongly concluding that commonly used English language words or phrases that appear frequently in a source are key words or key phrases.

The method further includes, at block 103, monitoring one or more computer-based activities of the user to obtain additional data corresponding to the user. For example, the one or more computer-based activities can comprise internet searches performed by the user when attempting to obtain the electronic document. As noted in the physician example discussed hereinabove, the searches performed by a user leading up to finding a particular electronic document, and the key words and/or key phrases used in those searches, can provide useful additional data of what the user was specifically looking for.

At block 105, the method 100 further includes inferring one or more interests of the user based on the additional data and the data obtained from the mining of the one or more sources. The inferring can include recognizing the key words or key phrases, which are repeatedly used across a number of the sources. The inferring can also include linking the key words and/or key phrases used in searches leading up to finding the electronic document to the interests of the user.

The method 100 further includes, at block 107, analyzing the electronic document to determine at least one portion of the electronic document related to the one or more interests. For example, as outlined further in FIG. 2, the analyzing can include opening the electronic document (block 201) and analyzing the text of the document for words, phrases or other terminology relevant to what has been determined to be the user's interests (block 203). According to an embodiment, a search is performed of the electronic document for the relevant terminology in the electronic document that matches and/or is similar to the key words, key phrases or other key terminology which were repeatedly used across a number of the sources, and which were used in searches leading up to finding the electronic document. The method further includes, at block 109, automatically highlighting the at least one portion of the electronic document related to the one or more interests. As can be further understood from block 205 in FIG. 2, in accordance with an embodiment of the present invention, the automatic highlighting can be of the relevant key words and/or key phrases in the electronic document. As noted herein, highlighting can be on the word or phrase level, or entire sentences, paragraphs and/or sections including the relevant key words, key phrases or other terminology can be highlighted.

As discussed herein, different highlighting formats (e.g., different surrounding colors) can be applied to respective portions of the electronic document to call out items of interest to particular users or groups of users, assigning a particular highlighting format to each user and/or group of users. Different highlighting formats can be applied to respective portions of the electronic document to call out items determined to be familiar to one or more users, items determined to be unfamiliar to one or more users, asserted or inferred new contributions in a particular field, and/or definitions.

Referring to block 207 of FIG. 2, the results of highlighting can be input to a knowledge database to be used in connection with future inferences of what a user is interested in and/or when determining what to highlight in a new electronic document. The knowledge database can include, for example, indexes of terminology, for example, key words and key phrases relevant to the interests of users or groups of users. As the system continues to automatically highlight different documents, the knowledge database can increase and/or be modified to correspond with updated inferences about the interests of users or groups of users.

In accordance with an embodiment of the present invention, referring to, for example, block 209 of FIG. 2, a method can also include monitoring reading of a highlighted electronic document by a user. Such monitoring can be performed to, for example, determine a time spent by the user on one or more portions of the electronic document. Data concerning time spent on certain portions of a document can lead to conclusions on what a user is interested in assuming that a user may spend more time on portions that are of particular interest to the user, and/or on what a user may be unfamiliar with if a user had to read something multiple times in order to gain an understanding of the subject matter. Data concerning time spent on certain portions of a document can also lead to conclusions about one or more reading styles of the user. For example, a user may only read certain portions of papers, such as an abstract and/or results and skip background portions, so that future highlighting may be concentrated on the portions that a user usually reads. Referring to block 211 of FIG. 2, the results of monitoring the reading of a highlighted electronic document by a user can be input to the knowledge database to be used in connection with future inferences of what a user is interested in and/or when determining what to highlight in a new electronic document.

In accordance with an embodiment of the present invention, a method can also include monitoring of reading by a user of one or more other electronic documents determined to be similar in content to the electronic document to obtain data including, for example, a time spent by the user to read all or a portion of each of the one or more other electronic documents. Based on this data, which can also be inputted to a knowledge database, a time for the user to read highlighted portions of an electronic document and/or a time for the user to read the entire electronic document can be estimated and provided to the user.

As noted hereinabove, the mining of one or more of the sources, inferring of one or more interests, analyzing the electronic document to determine portions of the electronic document related to the one or more interests, and automatically highlighting the relevant portions of the electronic document can be performed in connection with a team/group of users and based on one or more interests of the group. In addition, different highlighting formats can be applied to portions of an electronic document related to the one or more interests of each individual user, as well as to portions of the electronic document related to the one or more interests of the group as a whole.

FIG. 3 is a block diagram of a system for highlighting an electronic document, according to an exemplary embodiment of the present invention. As shown in FIG. 3 by lines and/or arrows, the components of the system 300 are operatively coupled to each other via, for example, physical connections, such as wired and/or direct electrical contact connections, and wireless connections, such as, for example, WiFi, BLUETOOTH, IEEE 802.11, and/or networks, including but not limited to, a local area network (LAN), wide area network (WAN), cellular network, ad hoc networks, WANET, satellite network or the Internet.

Referring to FIG. 3, the system 300 a mining component 310, executed via at least one processor, and configured to mine one or more sources to obtain data corresponding to a user, and an interest determination component 340, executed via at least one processor, and configured to infer one or more interests of the user based on the data. A highlighting component 330, executed via at least one processor, is configured to analyze the electronic document to determine at least one portion of the electronic document related to the one or more interests, and automatically highlight the at least one portion of the electronic document related to the one or more interests. According to an embodiment, the interest determination component 340 can be part of the highlighting component 330.

The system 300 further includes a monitoring component 320, executed via at least one processor, and configured to monitor, based on data from a sensing/tracking component 370 employing sensing/tracking software, one or more computer-based searches performed by the user when attempting to obtain the electronic document to obtain key words, key phrases or other terminology used in connection with the computer-based searches. Based on input from the mining and monitoring components 310, 320, the interest determination component 340 can infer the one or more interests of the user based on the terminology used in connection with the computer searches, and the data obtained from the mining of the one or more sources. As noted above, the inferring can include recognizing the key words or key phrases, which are repeatedly used across a number of the sources. The inferring can also include linking the key words and/or key phrases used in searches leading up to finding the electronic document to the interests of the user.

Referring to FIG. 3, the one or more sources can include, but are not necessarily limited to, emails 353 (e.g., emails sent and/or received by the user), created documents (e.g., documents that the user has written using, for example, a word processor 357), documents that the user has viewed on, for example, a viewer 359 (e.g., articles, papers), a browsing history of the user from a browser 351, and maintained in, for example, a cache 355, and/or any other type of textual media associated with the user. The elements 351, 353, 355, 357, 359 can be operatively coupled to a memory 350 that is accessible by the mining component 310 to retrieve the data associated with the one or more sources. In addition, the mining component can also be linked, via a network, such as the Internet, to social media sources 383, and/or databases 381 that may include information about the interests and/or projects of one or more users or groups of users.

The highlighting component 330 is operatively coupled to elements 351, 353, 355, 357, 359 in order to have access to an electronic document that is to be highlighted. The elements 351, 353, 355, 357, 359 and the highlighting component 330 is operatively coupled to a display 360 so that the highlighted electronic document can be displayed for a user.

The highlighting component 330 is configured to analyze the text of the document to be highlighted for words, phrases or other terminology relevant to what has been determined to be the user's interests. The highlighting component 330 can perform a search of the electronic document for the relevant terminology in the electronic document that matches and/or is similar to the key words, key phrases or other key terminology which were repeatedly used across a number of the sources, and which were used in searches leading up to finding the electronic document. As noted herein, highlighting can be on the word or phrase level, or entire sentences, paragraphs and/or sections including the relevant key words, key phrases or other terminology can be highlighted. Also, as discussed herein, different highlighting formats (e.g., different surrounding colors) can be applied to respective portions of the electronic document to call out items of interest to particular users or groups of users, items determined to be familiar to one or more users, items determined to be unfamiliar to one or more users, asserted or inferred new contributions in a particular field, and/or definitions.

The system 300 includes a knowledge database 390, which is configured to receive the results of highlighting from the highlighting component 330 and the inferred interest data from the input determination component 340 to be used in connection with future inferences of what a user is interested in and/or when determining what to highlight in a new electronic document. As noted above, the knowledge database 390 can include, for example, indexes of terminology, for example, key words and key phrases relevant to the interests of users or groups of users, and can increase and/or be modified to correspond with updated inferences about the interests of users or groups of users.

The monitoring component 320 is further configured to monitor, using data from, for example, a sensing/tracking component 370 employing sensing/tracking software, reading of a highlighted electronic document by a user. The sensing/tracking component 370 can track reading times, so that the monitoring component 320 can determine a time spent by the user on one or more portions of the electronic document. As noted above, data concerning time spent on certain portions of a document can lead to conclusions on what a user is interested in, and/or on what a user may be unfamiliar with, as well as conclusions about one or more reading styles of the user. The results of monitoring the reading of a highlighted electronic document by a user from the monitoring component 320 can be input to the knowledge database 390 to be used in connection with future inferences of what a user is interested in and/or when determining what to highlight in a new electronic document.

In accordance with an embodiment of the present invention, the monitoring component 320 is also configured to monitor, using data from, for example, a sensing/tracking component 370 employing sensing/tracking software, reading by a user of one or more other electronic documents determined to be similar in content to the electronic document to obtain data including, for example, a time spent by the user to read all or a portion of each of the one or more other electronic documents. Based in this data, which can also be inputted to a knowledge database 390, a time for the user to read highlighted portions of an electronic document and/or a time for the user to read the entire electronic document can be estimated and provided to the user.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
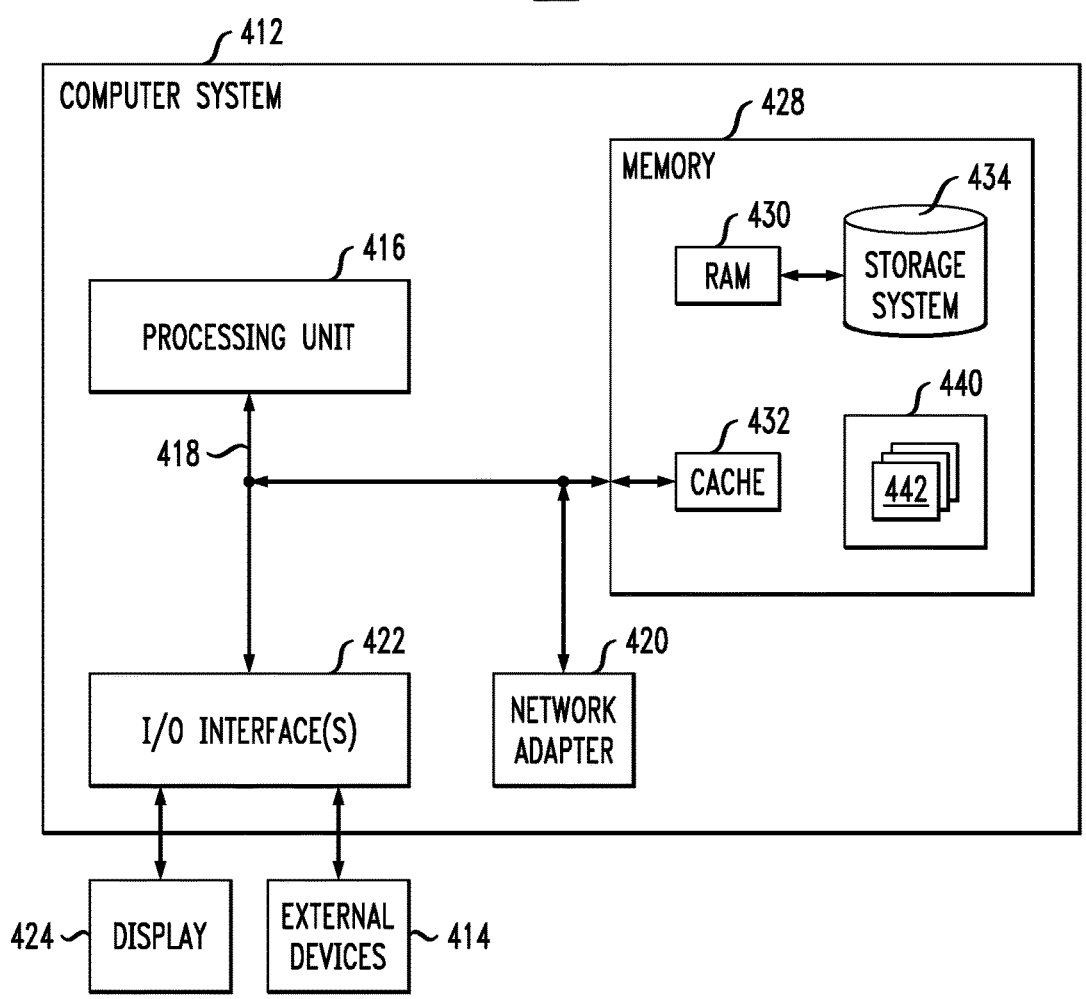
FIG. 4 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 410 in FIG. 4 can be an example of a cloud computing node. Computing node 410 is only one example of a suitable cloud computing node and is not intended to suggest any limitation as to the scope of use or functionality of embodiments of the invention described herein. Regardless, computing node 410 is capable of being implemented and/or performing any of the functionality set forth hereinabove. It is also to be understood that computing node 410 is not necessarily a cloud computing node.

Figure 5:
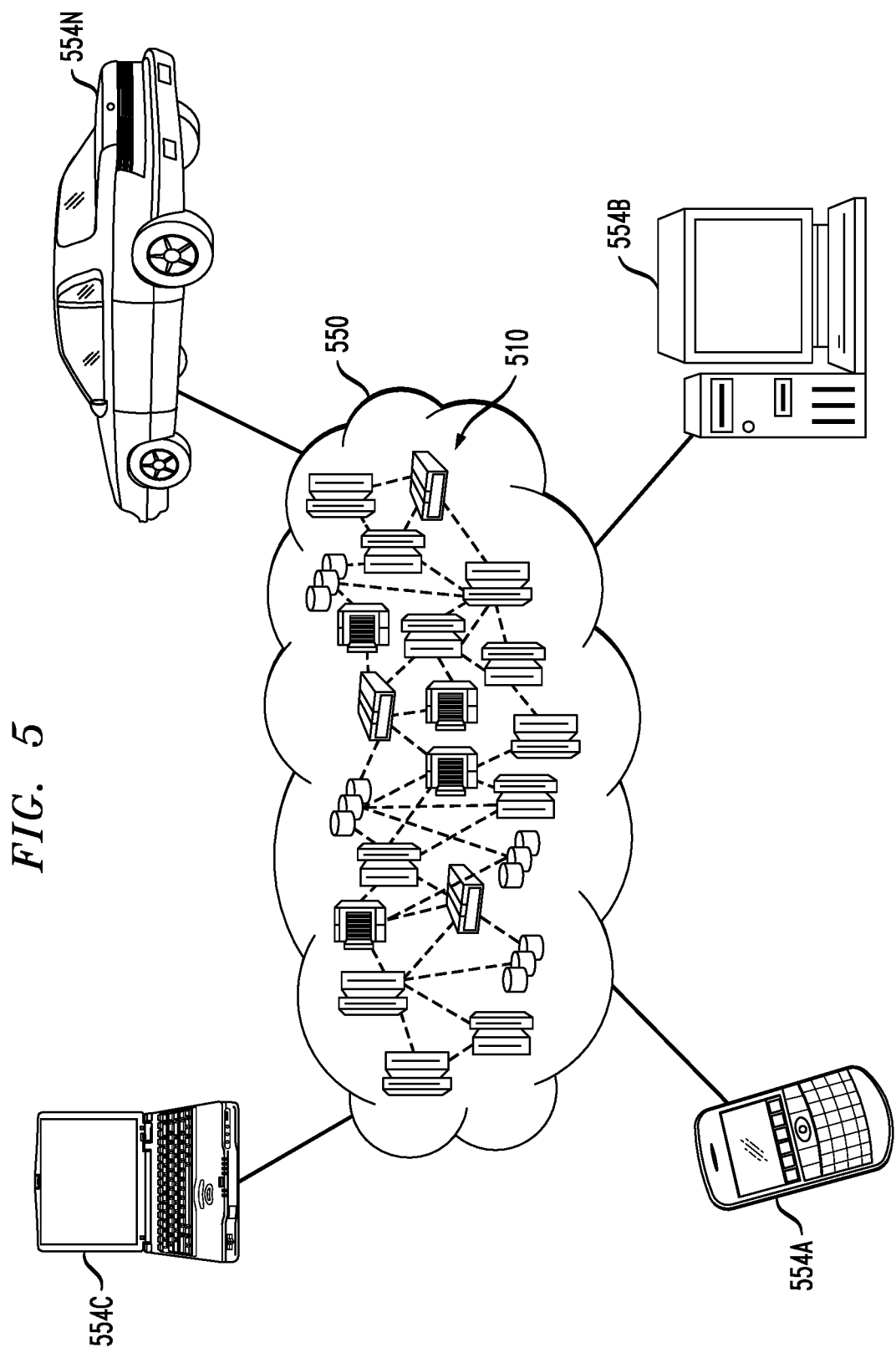
FIG. 5 depicts a cloud computing environment, according to an exemplary embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, a wearable device (not explicitly shown), a personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
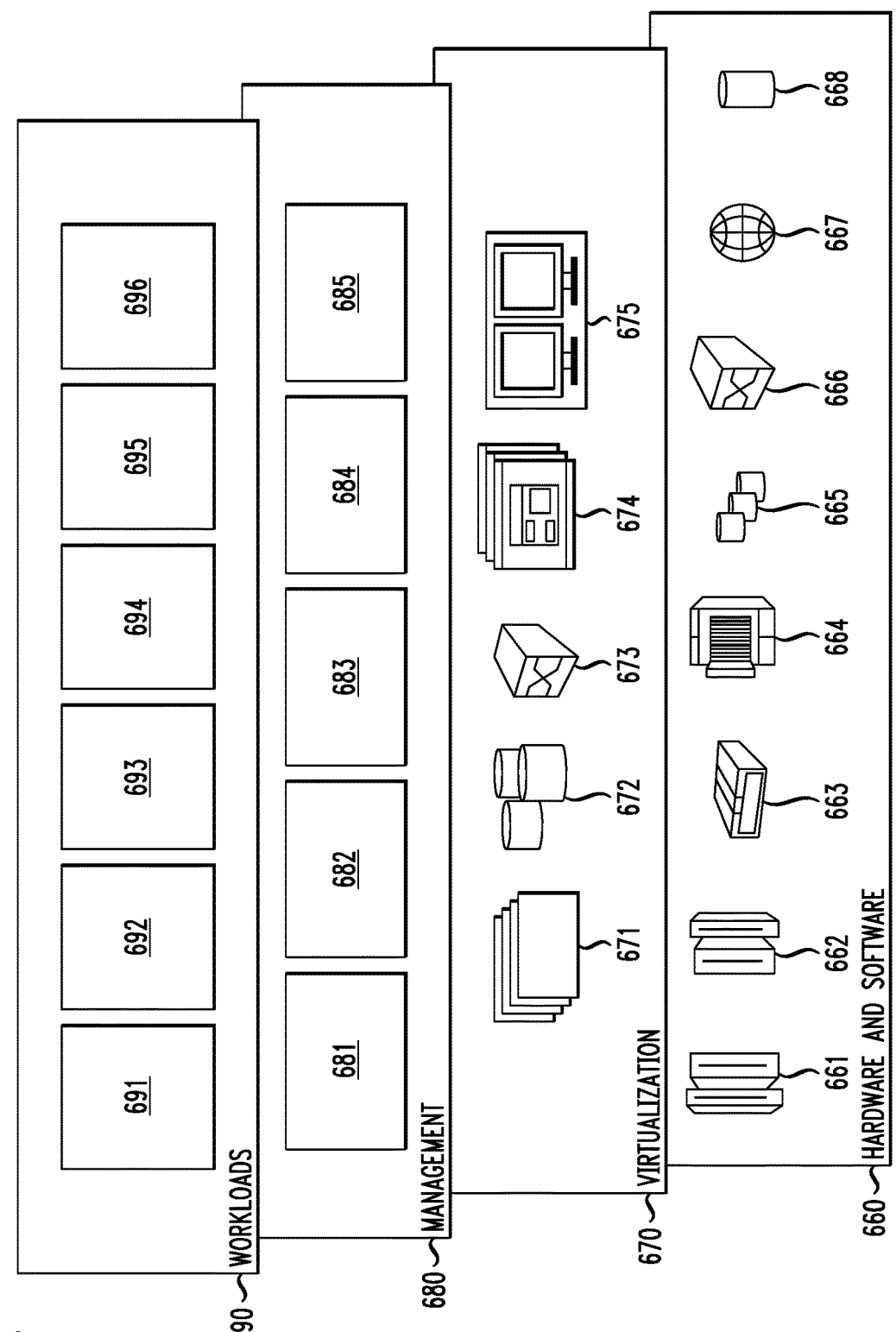
FIG. 6 depicts abstraction model layers, according to an exemplary embodiment of the invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and highlighting 696, which may implement the functionality described above with respect to FIGS. 1-5.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for highlighting an electronic document, comprising:

monitoring reading of a plurality of electronic documents by a user to determine a time spent by the user on one or more portions of the plurality of electronic documents, wherein the monitoring comprises applying tracking software to a browser utilized by the user to track and record the time one or more pages of the plurality of electronic documents are displayed on the browser;

inferring one or more reading patterns of the user based on the time spent on the one or more portions of the plurality of electronic documents, wherein the inferring comprises determining which portions of the plurality of electronic documents the user reads and the user skips;

mining one or more sources to obtain data corresponding to a user, wherein the data comprises the one or more reading patterns of the user;

inferring one or more interests of the user based on the data;

analyzing the electronic document to determine at least one portion of the electronic document related to at least one of the one or more interests and the one or more reading patterns of the user;

automatically highlighting the at least one portion of the electronic document related to at least one of the one or more interests and the one or more reading patterns of the user;

transmitting the automatically highlighted document over at least one network to a user device comprising a display; and electronically displaying the automatically highlighted document on the display of the user device, wherein the automatically highlighted document comprises an electronic modification of the at least one portion of the electronic document from a previous version of the electronic document;

wherein the steps of the method are performed by a computer system comprising a memory and at least one processor coupled to the memory.

2. The method according to claim 1, further comprising:

monitoring one or more computer-based activities of the user to obtain additional data corresponding to the user; and inferring the one or more interests of the user based on the additional data and the data obtained from the mining of the one or more sources.

3. The method according to claim 2, wherein:

the one or more computer-based activities comprise internet searches performed by the user when attempting to obtain the electronic document; and the additional data comprises at least one of key words and key phrases used in connection with the internet searches.

4. The method according to claim 1, further comprising:

monitoring reading by the user of one or more other electronic documents determined to be similar in content to the electronic document to obtain additional data corresponding to the user, wherein the additional data comprises a time spent by the user to read all or a portion of each of the one or more other electronic documents; and estimating at least one of a time for the user to read the at least one highlighted portion of the electronic document and a time for the user to read the entire electronic document, based on the time spent by the user to read all or a portion of each of the one or more other electronic documents.

5. The method according to claim 1, wherein the one or more sources comprise at least one of emails, created documents, viewed documents and a browsing history of the user.

6. The method according to claim 1, wherein the analyzing of the electronic document comprises searching for terminology in the electronic document that relates to the one or more interests of the user.

7. The method according to claim 1, further comprising:

mining one or more of the sources to obtain additional data corresponding to a group of users;

inferring one or more interests of the group based on the additional data;

analyzing the electronic document to determine at least one portion of the electronic document related to the one or more interests of the group; and automatically highlighting the at least one portion of the electronic document related to the one or more interests of the group.

8. The method according to claim 7, further comprising applying a different highlighting format to the at least one portion of the electronic document related to the one or more interests of the user than to the at least one portion of the electronic document related to the one or more interests of the group.

9. The method according to claim 1, wherein the automatically highlighting comprises applying different highlighting formats to respective portions of the electronic document.

10. The method according to claim 1, further comprising:

determining that the user is familiar with a first portion of the electronic document;

determining that the user is unfamiliar with a second portion of the electronic document; and applying different highlighting formats to respective first and second portions of the electronic document.

11. The method according to claim 1, further comprising:

determining that a first portion of the electronic document includes a new contribution in a particular field;

determining that a second portion of the electronic document lacks a new contribution in the particular field; and applying different highlighting formats to respective first and second portions of the electronic document.

12. The method according to claim 1, further comprising:

determining that a word has been defined in the electronic document; and automatically highlighting the defined word.

13. A system for highlighting an electronic document, comprising:

a memory and at least one processor coupled to the memory, wherein the at least one processor is configured to:

monitor reading of a plurality of electronic documents by a user to determine a time spent by the user on one or more portions of the plurality of electronic documents, wherein in monitoring, the at least one processor is configured to apply tracking software to a browser utilized by the user to track and record the time one or more pages of the plurality of electronic documents are displayed on the browser;

infer one or more reading patterns of the user based on the time spent on the one or more portions of the plurality of electronic documents, wherein in inferring, the at least one processor is configured to determine which portions of the plurality of electronic documents the user reads and the user skips;

mine one or more sources to obtain data corresponding to a user, wherein the data comprises the one or more reading patterns of the user;

infer one or more interests of the user based on the data;

analyze the electronic document to determine at least one portion of the electronic document related to at least one of the one or more interests and the one or more reading patterns of the user;

automatically highlight the at least one portion of the electronic document related to at least one of the one or more interests and the one or more reading patterns of the user; and transmit the automatically highlighted document over at least one network to a user device comprising a display;

wherein the automatically highlighted document is displayed on the display of the user device, and comprises an electronic modification of the at least one portion of the electronic document from a previous version of the electronic document.

14. The system according to claim 13, wherein the at least one processor is configured to:

monitor one or more computer-based searches performed by the user when attempting to obtain the electronic document to obtain at least one of key words and key phrases used in connection with the computer-based searches; and infer the one or more interests of the user based on at least one of the key words and key phrases and the data obtained from the mining of the one or more sources.

15. The system according to claim 13, wherein the at least one processor is configured to:

monitor reading by the user of one or more other electronic documents determined to be similar in content to the electronic document to obtain additional data corresponding to the user, wherein the additional data comprises a time spent by the user to read all or a portion of each of the one or more other electronic documents; and estimate at least one of a time for the user to read the at least one highlighted portion of the electronic document and a time for the user to read the entire electronic document, based on the time spent by the user to read all or a portion of each of the one or more other electronic documents.

16. The system according to claim 13, wherein the one or more sources comprise at least one of emails, created documents, viewed documents and a browsing history of the user.

17. The system according to claim 13, wherein the at least one processor is configured to:

mine one or more of the sources to obtain additional data corresponding to a group of users;

infer one or more interests of the group based on the additional data;

analyze the electronic document to determine at least one portion of the electronic document related to the one or more interests of the group; and automatically highlight the at least one portion of the electronic document related to the one or more interests of the group.

18. The system according to claim 17, wherein the at least one processor is configured to apply a different highlighting format to the at least one portion of the electronic document related to the one or more interests of the user than to the at least one portion of the electronic document related to the one or more interests of the group.

19. A computer program product for highlighting an electronic document, the computer program product comprising a non-transitory computer readable storage medium having program instructions embodied therewith, the program instructions executable by a processor to cause the processor to perform a method comprising:

monitoring reading of a plurality of electronic documents by a user to determine a time spent by the user on one or more portions of the plurality of electronic documents, wherein the monitoring comprises applying tracking software to a browser utilized by the user to track and record the time one or more pages of the plurality of electronic documents are displayed on the browser;

inferring one or more reading patterns of the user based on the time spent on the one or more portions of the plurality of electronic documents, wherein the inferring comprises determining which portions of the plurality of electronic documents the user reads and the user skips;

mining one or more sources to obtain data corresponding to a user, wherein the data comprises the one or more reading patterns of the user;

inferring one or more interests of the user based on the data;

analyzing the electronic document to determine at least one portion of the electronic document related to at least one of the one or more interests and the one or more reading patterns of the user;

automatically highlighting the at least one portion of the electronic document related to at least one of the one or more interests and the one or more reading patterns of the user;

transmitting the automatically highlighted document over at least one network to a user device comprising a display; and electronically displaying the automatically highlighted document on the display of the user device, wherein the automatically highlighted document comprises an electronic modification of the at least one portion of the electronic document from a previous version of the electronic document.

* * * * *